United States Patent
Mutel et al.

(10) Patent No.: US 11,505,649 B2
(45) Date of Patent: Nov. 22, 2022

(54) POLYMERIZATION PROCESS

(71) Applicant: DuPont Polymers, Inc., Wilmington, DE (US)

(72) Inventors: Ahmet Turgut Mutel, Napanee (CA); Shailesh Ratilal Doshi, Kingston (CA)

(73) Assignee: DUPONT POLYMERS, INC., Wilmington, DE (US)

( * ) Notice: Subject to any disclaimer, the term of this patent is extended or adjusted under 35 U.S.C. 154(b) by 92 days.

(21) Appl. No.: 16/650,118

(22) PCT Filed: Sep. 26, 2018

(86) PCT No.: PCT/US2018/052818
§ 371 (c)(1),
(2) Date: Mar. 24, 2020

(87) PCT Pub. No.: WO2019/067517
PCT Pub. Date: Apr. 4, 2019

(65) Prior Publication Data
US 2020/0277440 A1    Sep. 3, 2020

Related U.S. Application Data

(60) Provisional application No. 62/564,308, filed on Sep. 28, 2017.

(51) Int. Cl.
*C08G 69/26* (2006.01)
*C08G 81/00* (2006.01)
*C08J 3/00* (2006.01)
*C08L 77/06* (2006.01)

(52) U.S. Cl.
CPC ........... *C08G 69/265* (2013.01); *C08G 81/00* (2013.01); *C08J 3/005* (2013.01); *C08L 77/06* (2013.01); *C08J 2377/06* (2013.01); *C08L 2203/20* (2013.01); *C08L 2205/025* (2013.01)

(58) Field of Classification Search
CPC .......................... C08L 77/06; C08L 2205/025
See application file for complete search history.

(56) References Cited

U.S. PATENT DOCUMENTS

| | | | |
|---|---|---|---|
| 4,762,910 A | 8/1988 | Nielinger et al. | |
| 5,079,307 A | 1/1992 | Taylor et al. | |
| 5,597,888 A | 1/1997 | Nielinger et al. | |
| 5,708,125 A | 1/1998 | Liedloff et al. | |
| 5,756,647 A | 5/1998 | Schmid et al. | |
| 5,760,163 A | 6/1998 | Fisch et al. | |
| 5,917,004 A | 6/1999 | Liedloff et al. | |
| 5,955,569 A | 9/1999 | Dujari et al. | |
| 6,160,080 A | 12/2000 | Cucinella et al. | |
| 6,169,161 B1 | 1/2001 | Tachibana et al. | |
| 6,187,877 B1 | 2/2001 | Gotz et al. | |
| 6,191,251 B1 | 2/2001 | Pagilagan | |
| 6,248,861 B1 | 6/2001 | Ng | |
| 6,362,307 B1 | 3/2002 | Mohrschladt et al. | |
| 6,498,217 B1 | 12/2002 | Marek et al. | |
| 6,525,166 B1 | 2/2003 | Silvestro et al. | |
| 6,537,475 B1 | 3/2003 | Studholme | |
| 6,548,591 B2 | 4/2003 | Koning et al. | |
| 6,562,940 B2 | 5/2003 | Kuhn et al. | |
| 6,673,860 B1 | 1/2004 | Grutke et al. | |
| 6,759,505 B2 | 7/2004 | Willis-Papi et al. | |
| 6,696,544 B1 | 12/2004 | Thierry et al. | |
| 6,828,377 B2 | 12/2004 | Ilg et al. | |
| 6,828,413 B2 | 12/2004 | Koning et al. | |
| 6,864,354 B2 | 3/2005 | Peduto et al. | |
| 6,911,257 B2 | 6/2005 | Ruiten et al. | |
| 6,958,374 B2 | 10/2005 | Buhler et al. | |
| 7,005,481 B1 | 2/2006 | Lehmann et al. | |
| 7,572,856 B2 | 8/2009 | Ottenheijm | |
| 7,786,222 B2 | 8/2010 | Schmid et al. | |
| 7,794,647 B1 | 9/2010 | Deckard | |
| 8,007,916 B2 | 8/2011 | Kuhmann et al. | |
| 8,138,243 B2 | 3/2012 | Buhler et al. | |
| 8,420,772 B2 | 4/2013 | Cao et al. | |
| 8,501,900 B2 | 8/2013 | Buzinkai et al. | |
| 8,822,631 B2 | 9/2014 | Janssen et al. | |
| 8,877,888 B2 | 11/2014 | Speroni et al. | |
| 9,133,322 B2 | 9/2015 | Roth et al. | |
| 9,243,109 B2 | 1/2016 | Stroeks et al. | |
| 9,290,657 B2 | 3/2016 | Cocquet et al. | |
| 9,321,904 B2 | 4/2016 | Chung et al. | |
| 9,346,952 B2 | 5/2016 | Aepli et al. | |
| 9,428,612 B2 | 8/2016 | Rulkens et al. | |
| 9,453,107 B2 | 9/2016 | Lagneaux et al. | |
| 9,475,753 B2 | 10/2016 | Grolman et al. | |
| 2002/0091226 A1 | 7/2002 | Nichols et al. | |
| 2002/0183479 A1* | 12/2002 | Rulkens | C08G 69/26 528/310 |

(Continued)

FOREIGN PATENT DOCUMENTS

| | | |
|---|---|---|
| CN | 101503512 A | 8/2009 |
| CN | 101759851 A | 6/2010 |

(Continued)

OTHER PUBLICATIONS

International Search Report and Written Opinion in International Application No. PCT/US2018/052818, dated Dec. 13, 2018.

*Primary Examiner* — Ana L. Woodward

(57) ABSTRACT

The present invention relates to a process comprising the step of melt-mixing a semi-aromatic polyamide (A) having a melting point on second heating of 295° C. or less comprising terephthalamide repeat units and a polyamide oligomer (B) comprising terephthalamide repeat units and having an amine end group concentration of less than 2000 me q/Kg and an inherent viscosity of at least 0.10, at a temperature which is greater than the melting point on first heating of both semi-aromatic polyamide (A) and polyamide oligomer (B) for a time period sufficient to produce semi-aromatic polyamide (C) having a melting point on second heating which is greater than or equal to 300° C.

18 Claims, No Drawings

(56) References Cited

U.S. PATENT DOCUMENTS

| | | |
|---|---|---|
| 2003/0149228 A1 | 8/2003 | Loontjens et al. |
| 2003/0176594 A1 | 9/2003 | Loontjens et al. |
| 2004/0071837 A1 | 4/2004 | Grund et al. |
| 2005/0038201 A1 | 2/2005 | Wursche et al. |
| 2007/0043185 A1 | 2/2007 | Alms et al. |
| 2007/0161773 A1 | 7/2007 | Loontjens |
| 2008/0268167 A1 | 10/2008 | Gerteisen et al. |
| 2011/0028621 A1 | 2/2011 | Martens et al. |
| 2011/0172387 A1 | 7/2011 | Filou et al. |
| 2011/0275760 A1 | 11/2011 | Trouillet-Fonti et al. |
| 2013/0022766 A1 | 1/2013 | Butzke et al. |
| 2013/0231424 A1 | 9/2013 | Anada et al. |
| 2014/0171563 A1 | 6/2014 | Briffaud et al. |
| 2014/0179851 A1 | 6/2014 | Pfleghar et al. |
| 2015/0086737 A1 | 3/2015 | Nitsche et al. |
| 2015/0087803 A1 | 3/2015 | Jacquot et al. |
| 2015/0284531 A1 | 10/2015 | Aepli et al. |
| 2015/0329670 A1 | 11/2015 | Washio et al. |
| 2015/0337093 A1 | 11/2015 | Brink et al. |
| 2015/0353682 A1 | 12/2015 | Rulkens et al. |
| 2015/0361216 A1 | 12/2015 | Grolman et al. |
| 2016/0046766 A1 | 2/2016 | Fogle et al. |
| 2016/0130397 A1 | 5/2016 | Clauss et al. |
| 2016/0130398 A1 | 5/2016 | Zhu et al. |
| 2016/0137783 A1 | 5/2016 | Schmidt et al. |
| 2016/0145390 A1 | 5/2016 | Schmidt et al. |
| 2016/0152784 A1 | 6/2016 | Fillot et al. |
| 2016/0159983 A1 | 6/2016 | Zhu et al. |
| 2016/0168381 A1 | 6/2016 | Washio et al. |
| 2016/0271913 A1 | 9/2016 | Berger et al. |
| 2016/0271919 A1 | 9/2016 | Berger et al. |
| 2016/0271920 A1 | 9/2016 | Franosch et al. |
| 2016/0271921 A1 | 9/2016 | Berger et al. |
| 2016/0272767 A1 | 9/2016 | Hussein et al. |
| 2016/0273684 A1 | 9/2016 | Goering et al. |
| 2016/0289383 A1 | 10/2016 | Marchildon et al. |
| 2016/0289384 A1 | 10/2016 | Marchildon et al. |
| 2016/0369052 A1 | 12/2016 | Di Silvestro et al. |
| 2017/0044059 A1 | 2/2017 | Hsieh et al. |
| 2017/0044353 A1 | 2/2017 | Long et al. |
| 2017/0152382 A1* | 6/2017 | Hoekstra ................. B29B 7/002 |

FOREIGN PATENT DOCUMENTS

| | | |
|---|---|---|
| CN | 101759852 A | 6/2010 |
| CN | 101759853 | 6/2010 |
| CN | 102775601 A | 11/2012 |
| CN | 102786683 | 11/2012 |
| CN | 102786794 B | 11/2012 |
| CN | 102786795 A | 11/2012 |
| CN | 103184607 A | 7/2013 |
| CN | 103360599 A | 10/2013 |
| CN | 103539935 A | 1/2014 |
| CN | 103539936 A | 1/2014 |
| CN | 104098765 A | 10/2014 |
| CN | 104231262 A | 12/2014 |
| CN | 104403100 A | 3/2015 |
| CN | 104530421 A | 4/2015 |
| CN | 104672444 A | 6/2015 |
| CN | 104744688 A | 7/2015 |
| CN | 104923086 A | 9/2015 |
| CN | 105295031 A | 2/2016 |
| CN | 105330843 A | 2/2016 |
| CN | 105419316 A | 3/2016 |
| CN | 103102486 B | 7/2016 |
| CN | 105777553 A | 7/2016 |
| CN | 105778492 A | 7/2016 |
| CN | 106046365 A | 10/2016 |
| CN | 106117549 A | 11/2016 |
| DE | 10354605 A1 | 6/2005 |
| EP | 1302501 B1 | 4/2003 |
| EP | 2857456 B1 | 4/2015 |
| EP | 3008109 A1 | 4/2016 |
| EP | 3069876 A1 | 9/2016 |
| GB | 2538523 A | 11/2016 |
| JP | 07-138366 A | 5/1995 |
| JP | 3202701 B2 | 8/2001 |
| JP | 2005193193 A | 7/2005 |
| JP | 2008179807 A | 8/2008 |
| JP | 2011005856 A | 1/2011 |
| JP | 4953422 B2 | 6/2012 |
| JP | 4953669 B2 | 6/2012 |
| JP | 4974551 B2 | 7/2012 |
| JP | 2012149238 A | 8/2012 |
| JP | 2014139274 A | 7/2014 |
| JP | 2014173058 A | 9/2014 |
| JP | 2014177582 A | 9/2014 |
| JP | 2014181242 A | 9/2014 |
| JP | 2016138163 A | 8/2016 |
| JP | 2017002205 A | 1/2017 |
| KR | 20150077791 A | 7/2015 |
| TW | 2014041278 A | 11/2014 |
| WO | 99/61509 A1 | 12/1999 |
| WO | 01/25311 A1 | 4/2001 |
| WO | 2003014198 A1 | 2/2003 |
| WO | 2006133369 A1 | 12/2006 |
| WO | 2007069589 A1 | 6/2007 |
| WO | 2012084776 A1 | 6/2012 |
| WO | 2014198757 A1 | 12/2014 |
| WO | 2015/057557 A1 | 4/2015 |
| WO | 2015/197124 A1 | 12/2015 |
| WO | 2016030764 A2 | 3/2016 |
| WO | 201650910 A1 | 4/2016 |
| WO | 2016112013 A1 | 7/2016 |
| WO | 2016132829 A1 | 8/2016 |

* cited by examiner

POLYMERIZATION PROCESS

OVERVIEW

Described herein are novel processes for preparing semi-aromatic polyamides having melting points of 300° C. or greater and the novel semi-aromatic polyamides prepared by these processes. These processes reduce the time the semi-aromatic polyamides are exposed to high processing temperatures compared to typical processes, thus providing high melting point semi-aromatic polyamides having acceptable levels of decomposition products and unexpectedly high freezing points.

Generally, in the process used to prepare polyamides, polymerization of dicarboxylic acid and diamine reactant mixtures to form polyamides is accomplished by the gradual removal of water generated from the reactant mixture at elevated pressures by the continuous application of heat (and a consequent increase in the temperature of the reaction medium). In this manner, the majority of the water is removed while keeping the materials in liquid phase.

Conventional techniques for polymerization of polyamides may employ a solution or slurry of ingredients. The reaction paths for solution polymerizations are conventionally chosen in such a way that the reaction mixture is maintained in a liquid phase. This requirement to avoid any liquid-solid phase separation usually implies operating at significantly elevated pressures and correspondingly high temperatures in order to prevent any solids from forming in the solution and to remove water from the reaction mixture during the early stages of the polymerization, usually in excess of 300 to 400 psig for reaction mixtures containing terephthalic acid, such as PA-6T/66. Furthermore, removal of water generated during the later stages of polymerization by gradual reduction of pressure and increasing temperature above the melting point of the polymer requires relatively long times due to heat and mass transfer limitations. One disadvantage of polymerization under these conditions is the resultant high degree of degradation reactions and products which diminishes the usefulness of the final polymer product.

Those of skill in the art typically conduct early stage polymerization of polyamide systems based upon, for example, terephthalic acid, at elevated conditions of pressure and temperature so that the reaction proceeds above the solid polymer melting phase boundary. See for example, JP 7138366.

U.S. Pat. No. 6,759,505 discloses both single-phase and multi-phase continuous polymerization processes depending on the management of reaction conditions such as temperature, pressure, and residence time of the reactants in the reactor environment.

Alternatively, for the production of higher molecular weight polymers, two step semi-continuous processes have been employed for the polymerization of these polymers. Such approaches first require the formation of a low molecular weight polymer at high pressures and temperatures and later isolated either in solid or liquid form from the early stages of the polymerization. For example, U.S. Pat. No. 4,762,910 to Bayer, describes a process for making copolymers of adipic acid, terephthalic acid and hexamethylene diamine (HMD) by first preparing a polyamide oligomer and then further polymerizing the oligomer.

Further molecular weight build-up in such processes can also be achieved, for example, through subsequent processing using operating conditions which allow for rapid heating of the low molecular weight polymer above its melting point in high shear fields and generation of mechanical heat, like twin screw extruders.

There are numerous deleterious consequences in choosing to operate for extended periods of time at conditions of elevated temperatures and pressure which are needed to keep high melting point polyamides in the melt state. Most particularly, high temperatures prompt the early inception of degradation reactions, which have the effect of diminishing the usefulness of the final polymer product. An example is the amidine branching equilibrium associated with polymerization involving aromatic diacids. Further, the influence of pressure on fluid physical properties such as vapor phase density and vapor/liquid interfacial tension may be detrimental to achieving good heat transfer performance. Moreover, for two step processes, there are additional production costs associated with the isolation and re-melt of oligomers in an effort to prevent exposure of the polymers to high temperatures. Such processes pose challenges in the handling of powders. Even if the oligomer is kept in molten form, there are difficulties in limiting the degradation and contamination of materials, typically associated with oligomer-vapor separation chambers run at excessively high temperatures.

Manufacture of polyamides using batch processes typically have limitations in terms of the average molecular weight of polyamides which can be produced due to the viscosity limitations of the batch processes. The viscosity must be low enough that the polyamide produced can be discharged from the reactor at temperatures which do not decompose the polyamides. There have been considerable efforts to overcome these molecular weight limitations of batch processes by taking low molecular polyamides or oligomer products from batch reactors, and increasing their molecular weights by the use other processes such as solid state polymerization.

For example, U.S. Pat. No. 5,955,569 discloses a process in which solid pellets of a low molecular weight polyamide from a batch or continuous reactor are fed into a reaction vessel to increase the molecular weight of the polyamide by solid state polymerization using a catalyst incorporated into the low molecular weight polyamide.

U.S. Pat. No. 5,079,307 discloses a process for producing high molecular weight polyamides by preparing a low molecular weight polyamide having dicarboxy terminated ends. This acid rich pre-polymer is further polymerized in an extruder in the presence of a diamine monomer.

U.S. Patent Application No. 2007/0043185 discloses a process wherein a polyamide oligomer is further reacted in the liquid phase such that the polyamide forms a solid phase dispersed in the liquid phase and can then be separated from the liquid phase. The polymer may continue to polymerize in the solid phase.

U.S. Pat. No. 6,562,940 discloses a process to form high molecular weight polyamides in an extruder. A low molecular weight polyamide oligomer powder is processed in an extruder at a temperature below the melting point of the polyamide oligomer powder to form granules and the polyamide granules are subsequently post-condensed to form a high molecular weight polymer.

U.S. Patent Application No. 2016/0130397 discloses a continuous process for preparing polyamide oligomers and discharging the oligomers from the reactor. The polyamide oligomers are subsequently post condensed to give a polyamide.

PCT publication No. 99/61509 discloses the preparation of polyamides by reactive extrusion of very low molecular weight terephthalamide oligomers having a molecular weight of 300 to 600 with a polyamide in which the polyamide has a lower melting point than the oligomer. Such processes increase the terephthalamide content in the final polyamide.

U.S. Pat. No. 5,708,125 discloses a process in which a salt solution of a diamine and dicarboxylic acid are reacted in solution under steady state conditions and then spray dried from solution to obtain solid particles of the desired polyamide.

Typically, very high molecular weight polyamides are prepared by solid state polymerization of medium or low molecular weight polyamides. There remains a need for new processes to produce high molecular weight polyamides that avoids the longstanding requirement to operate at conditions in which deleterious polymerization side reactions, and with their attendant adverse heat and mass transfer physics, are associated due to the high viscosity and high melting points of high molecular weight semi-crystalline polyamides.

Abbreviations

The claims and description herein are to be interpreted using the abbreviations and definitions set forth below.

"%" refers to the term percent.
"psis" refers to the term pounds per square inch absolute.
"wt %" refers to weight percent.
"MPa" refers to megapascal
"KJ/m$^2$" refers to Kilojoule/square meter
"Mn" refers to number average molecular weight
"mp" refers to melting point
"DSC" refers to differential scanning calorimetry
"IV" refers to inherent viscosity
"fp" refers to freezing point
"° C." refers to degrees centigrade
"mol %" refers to mole percent
"A/D ratio" refers to dicarboxylic acid/diamine molar ratio in the salt
"DP" refers to degree of polymerization
"pph" refers to pounds per hour Definitions As used herein, the article "a" refers to one as well as more than one and does not necessarily limit its referent noun to the grammatical category of singular number.

As used herein, the term "article" refers to an item, thing, structure, object, element, device, etc. that is in a form, shape, configuration that is suitable for a particular use or purpose without further processing of the entire entity or a portion of it.

As used herein, the terms "degree of polymerization" or "DP" refer to the number of dicarboxylic acid monomers and diamine monomers which are polymerized together by amide bonds. For example, when a single carboxylic acid end group of a dicarboxylic acid monomer reacts with a single amine end group of a diamine monomer to form a single amide linkage, this product has a DP of 2 indicating one dicarboxylic acid monomer and one diamine monomer are bonded together by the amide group.

As used herein, the term "repeat unit" refers to part of a polymer whose repetition would produce the complete polymer chain. For example, for polyamide 66 the repeat unit is an adipic acid monomer bonded to a hexamethylenediamine monomer such that the repeat unit is adipic acid-hexamethylenediamine bonded together by an amide linkage. The resulting polymer is hexamethylene adipamide.

As used herein, the term "terephthalamide repeat unit" refers to the product of the reaction of a single terephthalic acid molecule with a single diamine molecule. The two molecules are covalently bonded together and comprise a single terephthalic acid molecule covalently bonded to a single diamine molecule.

A used herein, the term "oligomer" refers to a low molecular weight polyamide having a DP of at least 2.

As used herein, the term "polymer resin" refers to the neat polymer used in the polymer compositions and only comprises the polymer chain produced from the respective monomers. In other words, no additional additives are present in the polymer.

As used herein, the term "polymer composition" refers to a polymer resin and, optionally, any additional materials used in the composition such as UV stabilizers, lubricants, and fillers. If no additional materials are present in the polymer composition, then the polymer composition and polymer resin are identical.

As used herein, the term "all-melt process" refers to a process to produce polyamides in which the starting materials to prepare the polyamide, such as monomers, monomer salts, and oligomers, are melted, and once in the melt state, remain in the melt state until the final polyamide product is produced.

As used herein, the term "A/D ratio" refers to the molar ratio of dicarboxylic acid to diamine in the salt. The salt is formed from mixing a dicarboxylic acid with a diamine. The acid and base (diamine) react to form a salt.

The use of numerical values in the various ranges specified in this application, unless expressly indicated otherwise, are stated as approximations as though the minimum and maximum values within the stated ranges were both proceeded by the word "about". In this manner, slight variations above and below the stated ranges can be used to achieve substantially the same results as values within the ranges. Also, the disclosure of these ranges is intended as a continuous range including each and every value between the minimum and maximum values.

Ranges and Preferred Variants

Any range set forth herein expressly includes its endpoints unless explicitly stated otherwise. Setting forth an amount, concentration, or other value or parameter as a range specifically discloses all possible ranges formed from any possible upper range limit and any possible lower range limit, regardless of whether such pairs of upper and lower range limits are expressly disclosed herein. Compounds, processes and articles described herein are not limited to specific values disclosed in defining a range in the description.

The disclosure herein of any variation in terms of materials, chemical entities, methods, steps, values, and/or ranges, etc.—whether identified as preferred or not—of the processes, compounds and articles described herein specifically intends to include any possible combination of materials, methods, steps, values, ranges, etc. For the purpose of providing photographic and sufficient support for the claims, any disclosed combination is a preferred variant of the processes, compounds, and articles described herein.

In this description, if there are nomenclature errors or typographical errors regarding the chemical name any chemical species described herein, including curing agents of formula (I), the chemical structure takes precedence over the chemical name. And, if there are errors in the chemical structures of any chemical species described herein, the chemical structure of the chemical species that one of skill in the art understands the description to intend prevails.

Generally

Disclosed herein are novel processes for preparing semi-aromatic polyamides having melting points of at least 300° C. Such processes involve reacting semi-aromatic polyamide (A) having a melting point of 295° C. or less with polyamide oligomer (B) having a minimum DP of at least 3 and having a melting point which is greater than semi-aromatic polyamide (A), resulting in novel semi-aromatic polyamide (C) having melting points of greater than or equal to 300° C. In such processes, polyamide oligomer (B) reacts with and covalently bonds to semi-aromatic polyamide (A) by way of amidation and trans-amidation reactions to form a semi-aromatic polyamide (C) having a melting point which is at least 5° C. greater than the melting point of semi-aromatic polyamide (A). The novel semi-aromatic polyamides (C) also exhibit freezing points which are at least 4° C. higher than semi-aromatic polyamides (C) comprising the same molar concentration of repeat units but prepared by an all melt process.

Specifically, disclosed herein are novel processes comprising melt-mixing a semi-aromatic polyamide (A) having a melting point of 295° C. or less and comprising terephthalamide repeat units and a polyamide oligomer (B) comprising terephthalamide repeat units, said polyamide oligomer (B) having an amine end group concentration of less than 2000 meq/Kg and an IV of at least 0.10 measured in sulfuric acid according to ISO 307:2007 at a temperature which is greater than the melting point of both semi-aromatic polyamide (A) and polyamide oligomer (B) for a time period sufficient to produce a semi-aromatic polyamide (C) having a melting point which is greater than or equal to 300° C.

The novel processes disclosed herein have advantages over many existing processes to prepare high melting point semi-aromatic polyamides. These novel processes permit introduction of a very high molar concentration of terephthalic acid into the polyamide while simultaneously limiting exposure of the polyamides to the high reaction temperatures typically necessary to prepare semi-aromatic polyamides having a melting point of 300° C. or greater. These processes, being melt-mixed processes, do not require the use of solvents and the resultant recovery of such solvents from the processes to obtain the solid polyamides. By reducing or minimizing exposure of the polyamides to high reaction temperatures, decomposition products in the final polyamide are reduced compared to autoclave and some continuous polymerization processes. Additionally, the novel processes disclosed herein reduce the handling of powdered materials compared to some two step polymerization processes.

Semi-Aromatic Polyamide (A)

Semi-aromatic polyamide (A) can be any semi-aromatic polyamide having a melting point of 295° C. or less and comprising terephthalamide repeat units. Polyamide resin (A) may include copolymers, terpolymers, or higher polymers that are derived from monomers containing at least 20 mole percent to 100 mole percent terephthalic acid and one or more diamine monomers. Additional monomers include lactams, aromatic or aliphatic dicarboxylic acids, and other monomers which may be used in concentrations ranging from about 0 to 80 mole percent depending on the desired properties of the polyamide obtained from the process.

Preferably, semi-aromatic polyamide (A) is formed from terephthalic acid and one or more additional aromatic or aliphatic dicarboxylic acid components and one or more aliphatic diamine components. The one or more additional aromatic dicarboxylic acids can be, for example, isophthalic acid, naphthalenedicarboxylic acid, and substituted aromatic dicarboxylic acids such as for example 2-methylterephthalic acid.

The dicarboxylic acid component of semi-aromatic polyamide (A) contains at least 20 mole percent, preferably 30 mole percent, more preferably at least 40 mole percent, and most preferably at least 50 mole percent terephthalic acid. Preferably, the dicarboxylic acid component comprises a mixture of terephthalic acid (T) and isophthalic acid (I), wherein the mixture comprises a molar ratio of terephthalic to isophthalic acid (T:I) from about 50:50 to 60:40, preferably from about 52:48 to 56:44. Furthermore, the one or more aromatic dicarboxylic acids can be mixed with one or more aliphatic dicarboxylic acids, like adipic acid; pimelic acid; suberic acid; azelaic acid; sebacic acid and dodecanedioic acid. PA 6T/610 is an example of semi-aromatic polyamide (A) comprising an aliphatic dicarboxylic acid. The molar concentration of aromatic dicarboxylic acid(s) in semi-aromatic polyamide (A) disclosed herein, such as terephthalic acid, are based on the total molar concentration of all dicarboxylic acids present in semi-aromatic polyamide (A).

Semi-aromatic polyamide (A) comprises one or more aliphatic diamines that can be chosen among diamines having four or more carbon atoms, including, but not limited to tetramethylenediamine, hexamethylenediamine, octamethylenediamine, decamethylenediamine, dodecamethylenediamine, 2-methylpentamethylenediamine, 2-ethyltetramethylenediamine, 2-methyloctamethylenediamine, trimethylhexamethylenediamine, 1,4-diaminocyclohexane, bis(p-aminocyclohexyl)methane, and/or mixtures thereof.

Examples of semi-aromatic polyamide (A) may be independently selected from the group consisting of poly(hexamethylene terephthalamide/hexamethylene isophthalamide) (PA 6T/6I), poly(hexamethylene terephthalamide/hexamethylene hexanediamide) (PA6T/66), poly(hexamethylene terephthalamide/hexamethylene decanediamide) (PA6T/610), poly(hexamethylene terephthalamide/hexamethylene dodecanediamide) (PA6T/612), poly(decamethylene terephthalamide/decamethylene decanediamide) (PA10T/1010), poly(decamethylene terephthalamide/decamethylene isophthalamide) (PA10T/10I), poly(pentamethylene terephthalamide/pentamethylene decanediamide) (PA5T/510), poly(pentamethylene terephthalamide/pentamethylene isophthalamide) (PA5T/5I), poly(tetramethylene terephthalamide/tetramethylene decanediamide) (PA4T/410), poly(hexamethylene terephthalamide/nonamethylene terephthalamide) (PA 6T/9T), poly(nonamethylene terephthalamide/decamethylene terephthalamide) (PA 9T/10T), poly(decamethylene terephthalamide/11-aminoundecanamide) (PA 10T/11), poly(hexamethylene terephthalamide/hexamethylene isophthalamide/ε-caprolactam) (PA6T/6I/6), poly(hexamethylene terephthalamide/hexamethylene isophthalamide/hexamethylene hexanediamide) (PA6T/6I/66), poly(tetramethylene terephthalamide/ε-caprolactam) (PA4T/6), poly(hexamethylene terephthalamide/2-methylpentamethylene terephthalamide/hexamethylene hexanediamide) (PA6T/DT/66), poly(hexamethylene terephthalamide/hexamethylene tetradecanediamide) (PA6T/614), poly(nonamethylene terephthalamide/nonamethylene decanediamide) (PA9T/910), poly(nonamethylene terephthalamide/nonamethylene dodecanediamide) (PA9T/912), poly(nonamethylene terephthalamide/11-aminoundecanamide) (PA9T/11), poly(nonamethylene terephthalamide/12-aminododecanamide) (PA9T/12), poly(decamethylene terephthalamide/12-aminododecanamide) (PA10T/12) poly(decamethylene terephthalamide/ decamethylene dodecanediamide) (PA10T/1012), poly(decamethylene terephthalamide/ε-caprolactam) (PA10T/6), poly(dodecamethylene terephthalamide/dodecamethylene dodecanediamide) (PA12T/1212), poly(dodecamethylene terephthalamide/ε-caprolactam) (PA12T/6), poly(/hexamethylene terephthalamide/ε-caprolactam) (PA6T/6), poly(hexamethylene terephthamide/hexamethylene hexanediamide/2-methylpentamethylene hexanediamide) (PA 6T/66/D6), poly(hexamethylene terephthamide/2-methylpentamethylene terephthamide) (PA 6T/DT), poly(tetramethylene terephthalamide/hexamethylene terephthalamide) (PA4T/6T), poly(tetramethylene terephthalamide/11-aminoundecanamide) (PA4T/11), poly(hexamethylene terephthalamide/11-aminoundecanamide) (PA6T/11), poly(decamethylene terephthalamide/11-aminoundecanamide) (PA10T/11), poly(dodecamethylene terephthalamide/11-aminoundecanamide) (PA12T/11), poly(tetramethylene terephthalamide/12-aminododecanamide) (PA4T/12), poly(hexamethylene terephthalamide/12-aminododecanamide) (PA6T/12), and poly(pentamethylene terephthalamide/pentamethylene hexanediamide) (PAST/56).

Preferred semi-aromatic polyamides (A) include poly(hexamethylene terephthalamide/hexamethylene isophthalamide) (PA 6T/6I), poly(hexamethylene terephthalamide/hexamethylene hexanediamide) (PA6T/66), poly(hexamethylene terephthalamide/hexamethylene decanediamide) (PA6T/610), poly(hexamethylene terephthalamide/hexamethylene dodecanediamide) (PA6T/612), poly(decamethylene terephthalamide/decamethylene decanediamide) (PA10T/1010), poly(decamethylene terephthalamide/decamethylene isophthalamide) (PA10T/10I), poly(pentamethylene terephthalamide/pentamethylene decanediamide) (PAST/510), poly(pentamethylene terephthalamide/pentamethylene isophthalamide) (PAST/5I), poly(hexamethylene terephthalamide/hexamethylene isophthalamide/ε-caprolactam) (PA6T/6I/6), poly(hexamethylene terephthalamide/hexamethylene isophthalamide/hexamethylene hexanediamide) (PA6T/6I/66), and poly(pentamethylene terephthalamide/pentamethylene hexanediamide) (PAST/56).

Semi-aromatic polyamide (A) useful in the processes disclosed herein have a number average molecular weight ($M_n$) of at least 8,000, preferably at least 10,000. Although there is no absolute maximum $M_n$, it is preferred that the $M_n$ of semi-aromatic polyamide (A) is low enough such that it can be prepared using typical manufacturing processes. A desirable maximum $M_n$ is less than 30,000, preferably less than or equal to 20,000.

The manufacture of semi-aromatic polyamide (A) is easily within the skill of one in the art and many polyamides which may be used as polyamide resin (A) in the novel processes disclosed herein are commercially available. Semi-aromatic polyamide (A) may be made by any known process including batch, continuous, or semi-continuous processes. WO 2015/057557 discloses a process for preparing semi-aromatic polyamides using a batch process.

Polyamide Oligomer (B)

Polyamide oligomer (B) comprises terephthalamide repeat units, has an amine end group concentration of less than 2000 meq/Kg, and an inherent viscosity (IV) of at least 0.10. The melting point of polyamide oligomer (B) should be greater than the melting point of semi-aromatic polyamide (A) if the melting point of semi-aromatic polyamide (C) produced by the processes described herein is going to be at least 300° C. If the melting point of polyamide oligomer (B) is less than the melting point of semi-aromatic polyamide (A), the reaction of polyamide oligomer (B) with semi-aromatic polyamide (A) using the processes disclosed herein will not produce semi-aromatic polyamide (C) having a melting point of at least 300° C. Polyamide oligomer (B) may comprise repeat units other than terephthalamide repeat units.

One of the advantages of the reactive processes disclosed herein is the ability to increase the molar concentration of terephthalic acid in semi-aromatic polyamide (A) without exposing the polyamide to high temperatures for extended periods of time. It is known in the art that as the molar concentration of terephthalic acid increases in a polyamide, the melting point of the polyamide typically increases as well. As the melting point of the polyamide increases, it becomes more difficult to process/polymerize the polyamide in solution unless the temperature is increased to the point that decomposition of the polyamide becomes a concern, especially when the melting point of the polyamide is 300° C. or greater. The molar concentration of terephthalic acid present in polyamide oligomer (B) may be varied and is determined by the desired terephthalic acid concentration in semi-aromatic polyamide (C). Preferably, terephthalic acid is the only dicarboxylic acid present in polyamide oligomer (B). It is also preferred that polyamide oligomer (B) have a 10 mol % higher terephthalic acid concentration than semi-aromatic polyamide (A) based on the total molar dicarboxylic acids in semi-aromatic polyamide (A) in order to be able to increase the terephthalic acid content in semi-aromatic polyamide (A) to form semi-aromatic polyamide (C).

It is preferred that polyamide oligomer (B) have an amine end group concentration of 2000 meq/Kg or less, preferably 1500 meq/Kg or less, and more preferably 1000 meq/Kg or less. For example, it is known to one of skill in the art that hexamethylenediamine (HMD) monomer has an amine group concentration of 8000 meq/Kg as a 6T salt. When HMD monomer is reacted with terephthalic acid monomer to form an oligomer having a DP of 2, the oligomer has an amine group concentration of 4000 meq/Kg. It is understood by one of skill in the art that the amine end group concentration value is affected by the molar ratio of diacid to diamine (diacid:diamine) as well as DP. For the calculations of amine end groups disclosed herein, it is assumed that the diacid:diamine ratio is essentially 1.0.

Polyamide oligomer (B) may have a diacid:diamine ratio of from about 1.2 to 0.8, preferably from about 1.1 to 0.90, more preferably about 0.99 to 1.01 depending on the desired polyamide produced from the reaction of semi-aromatic polyamide (A) and polyamide oligomer (B).

It is additionally preferred that polyamide oligomer (B) has an intrinsic viscosity of at least about 0.10, preferably 0.15, more preferably 0.18, and most preferably at least 0.20.

It is preferred that polyamide oligomer (B) have a DP of at least 3, preferably at least about 4, more preferably at least about 6, and most preferably at least about 8. Although there is no absolute upper limit for the DP of polyamide oligomer (B) which may be used in the processes disclosed herein, a practical upper limit for DP is 30, preferably 25 or less, and more preferably 20 or less. From the amine end group concentration, IV, dicarboxylic acids, and diamines used to prepare polyamide oligomer (B), one of skill in the art can determine the DP of polyamide oligomer (B) since DP and amine end group concentration are interrelated.

Degree of polymerization or DP of polymers is discussed in the paper titled Fundamental Principles of Condensation Polymerization, P. J. Flory, Chem. Rev., 1946, 39 (1), p 171.

An alternative method of defining polyamide oligomer (B) which may be used in the processes disclosed herein is number average molecular weight ($M_n$). Although molecular weight ranges will change slightly based on the molecular weights of the dicarboxylic acids and diamines used as monomers, molecular weight is an easily measurable parameter for defining polyamide oligomer (B). Preferably, the molecular weight of polyamide oligomer (B) ranges from about 500 to 5000, more preferably from about 800 to 4000, and most preferably from about 1300 to 3000. Such molecular weights encompass the desired DP of polyamide oligomer (B).

The processes disclosed herein appear to be most effective at producing the desired polyamides when polyamide oligomer (B) has an intrinsic viscosity of at least about 0.10 and an amine end group concentration of 2000 meq/Kg or less. When polyamide oligomer (B) has an amine end group concentration of 2000 meq/Kg or less and an intrinsic viscosity of at least about 0.10, the DP of polyamide oligomer (B) is typically at least about 4.

Polyamide oligomer (B) may be prepared by any known process including batch, continuous, and semi-continuous processes. For example, WO 99/61509 discloses on page 7 the synthesis of a 6T polyamide oligomer using an autoclave with a helical ribbon agitator and spray drying of the oligomer.

A general process used to prepare polyamide oligomer (B) is disclosed in US patent application No. 2007/0043185. In one variation of this process, dicarboxylic acid and diamine monomers and other optional ingredients are charged into a reactor and the reaction mixture is brought to a temperature and pressure for a time such that polymerization takes place, followed by lowering the temperature and/or pressure resulting in a phase transition to form solid polyamide oligomer (B).

Alternatively, dicarboxylic acid and diamine monomers can be charged into a reactor and the reaction mixture is brought to a temperature and pressure for a time sufficient to produce a dicarboxylic acid-diamine salt. The salt can then be isolated and transferred into a different reactor where the salt is brought to a temperature and pressure for a time such that polymerization takes place, followed by lowering the temperature and/or pressure resulting in a phase transition to form solid polyamide oligomer (B).

Another alternative process involves adding an oligomer precursor that has a DP which is lower than the desired DP of the final polyamide oligomer (B) into a reaction vessel for further polymerization. In all variations water is vented from the process during polymerization.

As polymerization progresses in these process variations and polyamide oligomer (B) displaces monomer and oligomeric precursor, water is removed and a powder of polyamide oligomer (B) is formed due to phase inversion under the conditions that exist in the reactor.

Regardless of which variation is used to prepare polyamide oligomer (B) having the desired DP, once the desired DP is reached, polyamide oligomer (B) needs to be isolated from the multiphase system. This may be accomplished in a variety of ways depending on the equipment available.

In one variation, a single reactor, capable of creating high shear, is used for the entire oligomerization process to prepare and collect polyamide oligomer (B) as a powder. In this variation, the dicarboxylic and diamine monomers are charged into the reactor, polymerization takes place in the reactor while water is vented to form a multiphase system that comprises solid polyamide oligomer (B). Pressure and/or temperature of the reactor is then lowered and residual water is vented while shearing action in the reactor ensures that the solid polyamide oligomer (B) is collected in powder form as opposed to large chunks of material which may still comprise residual water. Polymerization can optionally be continued in the solid phase if a higher molecular weight product is required. In other words, if the DP needs to be further increased. One advantage of using a reactor having high shear capability to produce polyamide oligomer (B) is that the resulting powdered product has a higher density than powdered product obtained by spray drying. These higher density oligomer powders are more suitable for the novel processes disclosed herein, especially when extruders are used, than oligomer powders obtained by spray drying. Polyamide oligomer (B) also has a lower concentration of low molecular weight extractables when prepared by a high shear reactor than when prepared by spray drying processes.

In a further variation, conventional polymerization equipment can be used to produce polyamide oligomer (B) in solution. The solution is then spray dried to remove water and produce a powder of polyamide oligomer (B). If necessary to increase DP, this powder may be fed directly to a reactor for further polymerization.

One preferred type of equipment for preparing polyamide oligomer (B) is a plough mixer, for example the Lodige Ploughshare Mixer (Lodige, Paderborn, Germany), or a plow mixer manufactured by Littleford Day (Cincinnati, Ohio). However, any mixer or agitator that is capable of producing a flowable powder from the reactants after polymerization is suitable for preparing polyamide oligomer (B) in solid form.

A desired process for preparing polyamide oligomer (B) involves the following steps:
1) the desired weight ratio of diamine(s) and dicarboxylic acid(s) monomers to obtain the proper acid-amine balance in the polyamide oligomer (B) are mixed together in a reactor which is capable of creating high shear to form an aqueous solution. The aqueous solution is heated to a temperature and pressure for a time period necessary to polymerize the monomers while simultaneously venting water and increasing temperature up to a maximum temperature of 260° C. resulting in an oligomer solution;
2) pressure in the reactor is slowly reduced while temperature is maintained at 260° C. or less and additional water vented from the reactor resulting in a phase inversion to yield solid phase polyamide oligomer (B);
3) solid phase polyamide oligomer (B) is sheared under an inert gas purge to provide polyamide oligomer (B) as a powder.

Examples of polyamide oligomer (B) include without limitation hexamethylene terephthalamide (6T), pentamethylene terephthalamide (5T), nonamethylene terephthalamide (9T), decamethylene terephthalamide (10T), dodecamethylene terephthalamide (12T), poly(hexamethylene terephthalamide/hexamethylene hexanediamide) (PA6T/66), poly(hexamethylene terephthalamide/hexamethylene isophthalamide) (PA 6T/6I), poly(hexamethylene terephthalamide/hexamethylene decanediamide) (PA6T/610), poly(hexamethylene terephthalamide/hexamethylene dodecanediamide) (PA6T/612), isophorone diamine terephthalamide (IPDT), m-xylylene diamine terephthalamide (MXDT), and mixtures of these.

In addition to the use of polyamide oligomer (B) in the novel processes disclosed herein to prepare polyamides having high levels of terephthalic acid, polyamide oligomer (B) may be used in different processes to prepare polyamides having improved melt flow behavior by blending or melt-mixing high molecular weight polyamides with polyamide oligomers. For example, U.S. Pat. No. 6,548,591 discloses a process for improving the melt flow behavior of polyamides by mixing a high-molecular weight polyamide and a polyamide oligomer at a mixing temperature that is higher than the melting point of the high-molecular weight polyamide and at a melt temperature that is equal to or lower than the melting point of the polyamide oligomer.

U.S. Pat. No. 7,572,856 discloses melt mixing a polyamide and a flame retardant with a polyamide oligomer in which the polyamide oligomer has a lower melting point than the polyamide.

The novel processes disclosed herein are not limited to situations where the process is designed to increase the terephthalic acid concentration of the starting polyamide. These processes can be used to alter the composition of the starting polyamide by incorporating other monomers or oligomers into the polyamide. If one wishes to react polyamide oligomer (B) having a lower terephthalic acid content than semi-aromatic polyamide (A), the resulting polyamide may have useful properties for certain applications but such a polyamide will not have a higher terephthalic concentration than semi-aromatic polyamide (A).

Reaction of Semi-Aromatic Polyamide (A) with Polyamide Oligomer (B)

The reaction of semi-aromatic polyamide (A) with polyamide oligomer (B) can be conducted using any equipment which is capable of melt-mixing semi-aromatic polyamide (A) with polyamide oligomer (B) at a temperature, pressure, and time sufficient to increase the melting point of semi-aromatic polyamide (A) from less than or equal to 295° C. to at least 300° C.

The weight percent of polyamide oligomer (B) which may be combined with semi-aromatic polyamide (A) in the processes described herein ranges from about 5 weight percent to about 40 weight percent polyamide oligomer (B) based on the total weight of semi-aromatic polyamide (A) and polyamide oligomer (B). In other words, if 20 weight percent polyamide oligomer (B) is used then the weight percent of semi-aromatic polyamide (A) is 80 weight percent.

The processes disclosed herein may be batch processes, continuous, or semi-continuous processes. In continuous or semi-continuous processes, it is easily within one of skill in the art to use metering devices to assure that the proper weight ratio of polyamide oligomer (B) to semi-aromatic polyamide (A) is maintained during the process.

It is preferred that reaction of semi-aromatic polyamide (A) with polyamide oligomer (B) be carried out in an extruder designed for reactive-extrusion processes, with twin-screw extruders being preferred. The twin-screw extruders may be either co-rotating or counter-rotating.

Generally, the novel processes described herein to prepare novel polyamides involve first melt-mixing semi-aromatic polyamide (A) with polyamide oligomer (B). The method used to melt-mix semi-aromatic polyamide (A) and polyamide oligomer (B) is not limited to any particular process. For example, semi-aromatic polyamide (A) and polyamide oligomer (B) may be physically mixed together while both are in the solid state to form a mixture. The mixture may be stored for later use or may be immediately added to the melt-mixing equipment for reactive processing.

Examples of devices for physically mixing semi-aromatic polyamide (A) with polyamide oligomer (B) include rubber mills, internal mixers such as "Banbury" and "Brabander" mixers, single or multi-blade internal mixers, multi-barrel mixers such as "Farrell Continuous Mixers", injection molding machines, and extruders, both single screw and twin screw, either co-rotating or counter-rotating. These devices can be used alone or in combination with static mixers, mixing torpedoes and/or various devices to increase internal pressure and/or the intensity of mixing such as valves, gates, or screws designed for this purpose.

Alternatively, semi-aromatic polyamide (A) and polyamide oligomer (B) may be fed individually to the melt-mixing equipment in the desired weight ratios. If an extruder is used for the processes disclosed herein, semi-aromatic polyamide (A) and polyamide oligomer (B) may be fed at different locations in the extruder. For example, semi-aromatic polyamide (A) may be fed through the main feed port of the extruder and polyamide oligomer (B) may be fed through a side port. Semi-aromatic polyamide (A) and polyamide oligomer (B) may also be individually fed through the main feed port of the extruder or other equipment.

Since the melting point of polyamide oligomer (B) is preferably greater than the melting point of semi-aromatic polyamide (A), equipment conditions for the reactive processes must be set to achieve a final melt temperature higher than the melting point of polyamide oligomer (B). The equipment is vented to remove water generated from the polycondensation reaction between semi-aromatic polyamide (A) and polyamide oligomer (B) and to facilitate incorporation of polyamide oligomer (B) into semi-aromatic polyamide (A) resulting in the formation of semi-aromatic polyamide (C) having a melting point which is at least 5° C. above the melting point of semi-aromatic polyamide (A). If an extruder is used, semi-aromatic polyamide (C) may be extruded through a pelletizing die, quenched, and cut into pellets.

The time necessary for essentially complete reaction of polyamide oligomer (B) with semi-aromatic polyamide (A) to form semi-aromatic polyamide (C) depends on multiple factors such as the reactor temperature, degree of mixing during the reaction, residence time in the mixing device, melting points of the materials, and diacid:diamine balance.

Preferably, the time necessary for essentially complete reaction of polyamide oligomer (B) with semi-aromatic polyamide (A) to form semi-aromatic polyamide (C) ranges from about 15 seconds to 4 minutes at a temperature ranging from about 400° C. to 305° C., preferably from about 380° C. to 350° C. The higher the temperature used during the reaction, the shorter the time period necessary for complete reaction of polyamide oligomer (B) with semi-aromatic polyamide (A).

It is preferred that the reaction between polyamide oligomer (B) and semi-aromatic polyamide (A) occur in a single pass through an extruder or other device. Alternatively, essentially complete reaction may be accomplished using multiple passes through the extruder. For example, polyamide oligomer (B) and semi-aromatic polyamide (A) may be reacted in an extruder at a temperature of about 350° C. for 1 minute and the extruded material fed back into the extruder and further reacted at the same temperature and time. This process may be repeated until essentially complete reaction between polyamide oligomer (B) and semi-aromatic polyamide (A) has occurred to form semi-aromatic polyamide (C).

One advantage of the reactive processes described herein is that the polyamides are not exposed to excessively high temperatures for extended periods of time. Typically, the time that the melt-mixed composition is kept above the melting point of polyamide oligomer (B) in order for essentially complete reaction to occur between polyamide resin (A) and polyamide oligomer (B) is less than 5 minutes, preferably less than 3 minutes, and more preferably less than 2 minutes, and most preferably less than 1 minute. Longer reaction times are possible but undesirable due to the potential for decomposition of the polyamides. Essentially complete reaction is defined as less than about 5 percent, preferably less than about 2 percent residual unreacted polyamide oligomer (B) in the final semi-aromatic polyamide (C). The presence of unreacted polyamide oligomer (B) in semi-aromatic polyamide (C) results in double melting peaks in the DSC (when measured at 390° C.) of the test sample due to unreacted polyamide oligomer (B) in the test sample. The presence of unreacted polyamide oligomer (B) in semi-aromatic polyamide (C) may result in poor mechanical properties.

Specifically, semi-aromatic polyamide (C) can be prepared by the process of melt-mixing a semi-aromatic polyamide (A) having a melting point of 295° C. or less and comprising at least one terephthalamide repeat unit and a polyamide oligomer (B) comprising at least one terephthalamide repeat unit and having an amine end group concentration of less than 2000 meq/Kg and an IV of at least 0.10 measured in sulfuric acid according to ISO 307:2007 at a temperature which is greater than the melting point of both semi-aromatic polyamide (A) and polyamide oligomer (B) for at time period sufficient to produce a semi-aromatic polyamide (C) having a melting point which is greater than or equal to 300° C.

Additionally, semi-aromatic polyamide (C) prepared by the novel processes disclosed herein unexpectedly exhibit a freezing point, measured according to ASTM 3418:2015, which is at least 4° C. greater than a semi-aromatic polyamide (C) comprising the same molar concentration of identical repeat units but prepared by an all melt process. The freezing point of semi-aromatic polyamide (C) is taken on a sample of semi-aromatic polyamide (C) directly from the processing equipment and which has not been exposed to any additional heat history. In other words, the freezing point of semi-aromatic polyamide (C) is taken on a sample obtained after the sample has exited the die and been cooled in a water bath.

The processes disclosed herein are useful in preparing semi-aromatic polyamides having a melting point greater than 300° C. Polyamides having such high melting points are useful in preparing articles which are used in applications such as automotive engine parts, automotive under the hood parts, electronic parts, an electrical part in a vehicle, a connector, a plug, a sensor, a relay, a solenoid, a switch, and parts for water management systems.

EXAMPLES

The novel processes and polyamides disclosed herein are further defined by the following Examples. It should be understood that these examples, while indicating certain preferred aspects of the disclosure, are given by way of illustration only. From the above discussion and these examples, one skilled in the art can ascertain the essential characteristics of this disclosure, and without departing from the spirit and scope thereof, can make various changes and modifications to adapt it to various uses and conditions.

The exemplary articles are identified by "E" in the tables below are intended only to further illuminate and not to limit the scope of compounds, processes, and articles described and recited herein. Comparative examples are identified in the tables below by "C".

Test Methods
Melting and Freezing Points

Herein melting points and freezing points were determined by DSC (TA Instruments Q2000 or Q1000, TA Instruments, New Castle, Del., USA) at a scan rate of 10° C./min in the both first and second heating scans and in the cooling cycle according to ASTM D3418:2015 wherein the melting point is taken at the maximum of the endothermic peak and wherein the final temperature and isothermal hold time are as indicated in the tables. All samples were tested in aluminum pans under nitrogen at a purge rate of 50 ml/min. When two values are listed in the tables for a melting point, it indicates that the sample had two melting points. All melting points and freezing points in the tables are in ° C.

For DSC data in tables 3A, 3B, 3C, and 3D a TA Instruments Q1000 was used with the following selections.
Sample mass: 3+/−1 mg
Sample form: pellet cut into quarters to obtain 3 mg sample For DSC data in tables 1B, 2A, 2B, 3E, 3F, and 3G a TA Instruments Q2000 was used with the following selections.
Sample mass: 10+/−1 mg
Sample form: pellets were cryogenically ground to fine powder Inherent Viscosity Inherent viscosity was measured in two different solvents depending on the material to be tested.

Inherent viscosity (IV) was measured on a 0.5% solution of the polyamide to be tested in either 98% sulfuric acid or in m-cresol at 25° C., using a Schott AVS310 viscosity measuring unit, a Schott CK300 cooling unit, and a Schott CT52 constant temperature bath according to the method described in ISO 307:2007.

Amine End Determination

Amine Ends were measured in two different solvents depending on the material to be tested.

Amine ends of the samples were determined by titrating a 1 percent solution of polyamide or oligomer in a phenol/methanol mixture (90:10 by volume) or hexafluoroisopropanol with 0.025 N perchloric acid solution. The end point was determined potentiometrically, using a Metrohm "Tiamo" operating system with a Titrando 809 and Dosino 800 burette, along with a Metrohm pH electrode, all available from Metrohm USA, Riverview, Fla., USA.

Acid End Determination

Polymer samples were dissolved in a blend (55:45 by volume) of two solvents: solvent 1=95:5 o-cresol/o-dichlorobenzene and solvent 2=20% lithium chloride in methanol; followed by addition of 1 wt % perchloric acid in methanol, in slight excess of the amount required to react with the amine ends until the solution is acidic. The polymer solutions were titrated with 0.04 N tetrabutylammonium hydroxide in benzyl alcohol, through the potentiometric endpoint for the excess perchloric acid, to the end point for the carboxyl ends. A Metrohm "Tiamo" operating system with a Titrando 809 and Dosino 800 burette, along with a Metrohm pH electrode, all available from Metrohm USA, Riverview, Fla., USA, was used. The difference in the titres for the two endpoints was used to calculate the carboxyl ends concentration.

Materials

In the compounds, processes, and articles exemplified in the tables below, the following materials were used. All percent values are by weight unless indicated otherwise.

Synthesis of Semi-Aromatic Polyamide (A) 6T/6I

The 6T/6I semi-aromatic polyamide (A) used in examples E1 to E13, E14a, E14b, C1a, and C1b were made in a 400-gallon agitated autoclave in a one-step all melt batch process as described below. Amounts of ingredients and temperatures used for each semi-aromatic polyamide (A) are listed in Table 1.

A salt reactor was charged with hexamethylenediamine (HMD), water, terephthalic acid (TPA), isophthalic acid (IPA). The salt reactor is a jacketed agitated reactor with steam at the jacket to provide heat. The salt reactor was heated under nitrogen to 90° C. while continuously mixing the ingredients and at 15 psia to make a salt solution. Salt pH was measured to ensure the proper diamine to diacid ratio and adjusted accordingly with diamine or diacid. The salt solution was then pumped to a 400 gal autoclave and the remaining ingredients (acetic acid, sodium hypophosphate (SHP) and antifoam agent) were charged to the autoclave. The autoclave was heated while stirring to 160° C. and at a pressure of 65 psia for the evaporation cycle. The total evaporation cycle time was 120 to 130 minutes.

The pressure on the now concentrated salt solution was increased in a first cycle from 65 psia to 265 psia over a time period of from 55 to 75 minutes. A pressure control valve was manipulated in a manner to achieve the desired pressure/temperature required for different cycles. The pressure was held constant at 265 psia in a second cycle while the temperature was increased from 160° C. to 230° C. at which point the pressure was gradually increased at 5.3 psi/min. to a final pressure of 345 psia. The temperature was also gradually increased during this time to a cycle two end temperature as indicated in table 1. The total reaction time for the second cycle was 85-95 min. During the third cycle, the pressure and temperature were slowly dropped in stages 3A to 3C as shown in table 1. During the final (vacuum) cycle (cycle 4), agitator power was used as an indication of the melt viscosity and molecular weight of polyamide resin (A). Vacuum cycle typically lasted about 10 to 15 min.

TABLE 1

| Ingredients | 6T/6I (60/40) | 6T/6I (56/44) | 6T/6I (52/48) |
| --- | --- | --- | --- |
| Water (lb) | 1333 | 1375 | 1280 |
| HMD (lb) (90% solution) | 430 | 444 | 414 |
| TPA (lb) | 331 | 318 | 276 |
| IPA (lb) | 220.5 | 250 | 254 |
| Acetic acid (lb) | 11.3 | 11.7 | 10.9 |
| SHP (gr) | 74 | 75.8 | 70.8 |
| Carbowax 8000 (gr) (antifoam) | 9.2 | 9.5 | 8.8 |
| Reactor Conditions | | | |
| Cycle 2 end temperature (° C.) | 300 | 290 | 280 |
| Cycle C3A pressure ramp down rate (psi/min) | 6 | 6 | 6 |
| Cycle 3A final pressure (psia) | 255 | 255 | 255 |
| Cycle 3A minimum end temperature (° C.) | 305 | 295 | 285 |
| Cycle 3B pressure ramp down rate (psi/min) | 8 | 8 | 8 |
| Cycle 3B final pressure (psia) | 55 | 55 | 55 |
| Cycle 3B minimum end temperature (° C.) | 310 | 300 | 290 |
| Cycle 3C pressure ramp down rate (psi/min) | 4 | 4 | 4 |
| Cycle 3C final pressure (psia) | 17 | 17 | 17 |
| Cycle 3C minimum end temperature (° C.) | 315 | 305 | 295 |
| Cycle 4 final pressure (psia) | 10.5 | 10.5 | 10.5 |

TABLE 1-continued

| Ingredients | 6T/6I (60/40) | 6T/6I (56/44) | 6T/6I (52/48) |
| --- | --- | --- | --- |
| Cycle 4 ramp rate (psi/min) | 0.5 | 0.5 | 0.5 |
| Cycle 4 maximum temperature (° C.) | 320 ± 2 | 310 ± 5 | 300 ± 5 |
| Cycle 4 max time (min) | 10-15 | 10-15 | 10-15 |

Synthesis of Semi-Aromatic Polyamide (A): 10T/1010 80/20

The 10T/1010 semi-aromatic polyamide (A) used in examples E15 and E16 were prepared in a 12 L agitated autoclave in a one-step all melt batch process similar to the process used to prepare 6T/6I as described below. Amounts of ingredients and temperatures used are listed in Table 1A.

A 12 L heatable autoclave equipped with a helical agitator was charged with all the ingredients listed in Table 1A. The autoclave was sealed and agitated at 5 RPM for 10 min under continuous nitrogen purge and then heated while stirring to 155° C. at a pressure of 55 psia for the evaporation cycle to provide a concentrated salt solution. The total evaporation time was 30 to 45 min.

Pressure on the concentrated salt solution was increased in a first cycle from 55 psia to 200 psia over a time period of about 15 to 25 min. A pressure control valve was manipulated in a manner to achieve the desired pressure/temperature required for different cycles. The pressure was held constant at 200 psia in a second cycle while the temperature was increased from 155° C. to 230° C. at which point the pressure was gradually increased at 3.2 psi/min. to a final pressure of 345 psia. The temperature was also gradually increased during this time to a final temperature as indicated in table 1A. The total reaction time for the second cycle was 120-135 min. During the third cycle, the pressure and temperature were slowly dropped at 7.3 psi/min to atmospheric pressure. During the final (vacuum) cycle (cycle 4), agitator torque was used as an indication of the melt viscosity and molecular weight of polyamide resin (A) to terminate the final cycle and start casting. Vacuum cycle typically lasted about 20 min or until the target torque was reached.

TABLE 1A

| Ingredients (gr) | 10T1010 (80/20) |
| --- | --- |
| Water (gr) | 2510 |
| 1,10-Diaminodecane | 1686 |
| TPA | 1269 |
| Sebacic acid | 386 |
| Acetic acid | 23 |
| SHP | 0.74 |
| 1% Carbowax 8000 solution (antifoam) | 14.8 |
| Reactor Conditions | |
| Cycle 2 end temperature (° C.) | 290 |
| Cycle C3 pressure ramp down rate (psi/min) | 7.3 |
| Cycle 4 final pressure (psia) | 10 |
| Cycle 4 maximum temperature (° C.) | 315 ± 2 |
| Cycle 4 max time (min) | Max. 20 min or until desired torque of the agitator shaft is reached |

Synthesis of Semi-Aromatic Polyamide (A) 6T/66 (25/75)

Semi-aromatic polyamide A (6T/66 25/75) was prepared by melt mixing 73.5 wt % commercial PA66 (DuPont Zytel® 101) and 26.5 wt % 6T oligomer in a 26 mm extruder, both fed through the main feed port, using the following conditions: melt temperature at the die was 368° C., throughput: 50 pph, screw RPM: 800. Physical properties of PA-6A are shown in table 1B.

Table 1B shows physical properties of different semi-aromatic polyamides (A) used in the novel processes disclosed herein to prepare semi-aromatic polyamide (C).

TABLE 1B

| | PA-1A | PA-2A | PA-3A | PA-4A | PA-5A | PA-6A |
|---|---|---|---|---|---|---|
| 6T | 60 | 52 | 56 | 52 | | 25 |
| 6I | 40 | 48 | 44 | 48 | | |
| 1010 | | | | | 20 | |
| 10T | | | | | 80 | |
| 66 | | | | | | 75 |
| Properties | | | | | | |
| IV | 0.92[1] | 0.96[1] | 0.95[1] | 0.90[1] | 0.90[2] | 0.96[2] |
| Amine Ends[2] | 32 | 24 | 27 | 28 | | Not fully dissolved |
| Carboxyl Ends | 120 | 93 | 112 | 98 | | Not fully dissolved |
| Capped Ends | 65 | 65 | 65 | 65 | 130 | 0 |
| MP[4] (1$^{st}$ heating) | 296 | 289 | 288 | 288 | 279 292 | 252 |
| MP[4] (2$^{nd}$ heating) | 290 | 276 | 279 | 279 | 284 | 239 297 |
| FP[4] | 238 | 223 | 214 | 218 | 257 | 225 |

Concentrations are in mol %
[1]in m-cresol
[2]in sulfuric acid
[3]in phenol-methanol
[4]MP and FP determined by DSC at 350° C. maximum temperature with 1 min isothermal hold Polyamide Oligomer (B): 6T Polyamide oligomer (B), 6T, used in examples E1 to E13, E14a, E14b, C1a, and C1b was prepared according to the following procedure.

A 45-gallon salt reactor was charged with 33 kg of water, 11.4 kg of 70% hexamethylenediamine solution, 11.5 kg of terephthalic acid, 173 gr of 1% sodium hypophosphate solution, and 86 gr of 1% Carbowax 8000 solution and then heated to 90° C. at a pressure of 14.5 psig for 60 minutes while stirring the ingredients resulting in a clear solution of in-situ-formed nylon salts. The salt solution was then pumped to a plough reactor at atmospheric pressure. The plough reactor was equipped with a heating jacket, a plough mixer, and a high shear chopper. Hot oil from a hot oil skid was used to provide heat for evaporation and reaction through the plough reactor jacket. The oligomerization process in the plough reactor started by providing heat through the jacket while mixing by plough mixer and chopper. The autogenous pressure in the plough reactor was increased to 365 psia in about 4 hours. The plough reactor was vented at this point and temperature slowly increased from 220° C. to 245° C. in 2 hours. When temperature of the oligomer solution reached 245° C., the plough reactor pressure was ramped down in about 45 min to atmospheric pressure. This resulted in a phase transition in which the polyamide oligomer becomes the solid phase. The polyamide oligomer was cooled to 60° C. in about 2 hours and discharged from the plough reactor to provide polyamide oligomer (B) used in the examples. Tables 2A and 2B disclose the IV and amine end group concentration of various 6T polyamide oligomers (B) except for O-13B which is 10T.

TABLE 2A

| Properties | O-1B | O-2B | O-3B | 0-4B | O-5B | O-6B | O-7B |
|---|---|---|---|---|---|---|---|
| A/D ratio | 0.99 | 0.99 | 0.95 | 0.97 | 0.97 | 0.97 | 0.95 |
| IV[1] | 0.20 | 0.23 | 0.22 | 0.25 | 0.26 | 0.24 | 0.23 |
| Amine Ends[2] | 813 | 587 | 793 | 605 | 544 | 678 | 673 |
| MP* (1$^{st}$ heating) | 365 | 369 | 365 | 366 375 | 369 | 368 | 366 374 |
| MP* (2$^{nd}$ heating) | 355 | 360 | 354 | 362 | 360 | 358 | 358 |
| FP* | 325 | 333 | 323 | 337 | 334 | 328 | 330 |

*MP and FP determined by DSC at 395° C. maximum temperature with 1 min isothermal hold
[1]98% sulfuric acid
[2]hexafluoroisopropanol

TABLE 2B

| Properties | O-8B | O-9B | 0-10B | O-11B | O-12B | O-13B | O-14B | 0-15B |
|---|---|---|---|---|---|---|---|---|
| A/D ratio | 0.93 | 0.90 | 0.23 | 0.25 | 0.23 | 0.97 | 0.95 | |
| IV[1] | 0.23 | 0.27 | 0.90 | 1.2 | | 0.51 | 0.25 | 0.26 |
| Amine Ends[2] | 802 | | | 694 | 656 | N/A | 694 | 555 |
| MP* (1$^{st}$ heating) | 364 373 | 358 369 | 357 372 | 367 | 367 | 302 312 | 367 | 367 |
| MP* (2$^{nd}$ heating) | 356 | 350 | 352 360 | 355 | 355 | 290 | 355 | 352 |
| FP* | 329 | 326 | 333 | 329 | 328 | 263 | 329 | 323 |

*MP and FP determined by DSC at 395° C. maximum temperature with 1 min isothermal hold
[1]98% sulfuric acid
[2]hexafluoroisopropanol Polyamide Oligomer (B): 10T Polyamide oligomer (B), 10T, was prepared according to the following procedure. Properties are listed in Table 2B as sample O-13B.

A salt reactor was charged with 20 kg of water, 10.3 kg of 1,10-diaminodecane, 9.6 kg of terephthalic acid, 176 gm of 1% sodium hypophosphate solution, and 88 gm of 1% Carbowax 8000 solution. The mixture was heated to 80° C. at atmospheric pressure for 60 minutes while stirring the ingredients until the 1,10 diaminodecane was dissolved. The resulting slurry was pumped to the plough reactor at atmospheric pressure. The 10T salt was processed under the same conditions as the 6T oligomers to provide 10T oligomers in powder form. The amine ends of O-13B could not be accurately determined due to undissolved oligomer.

Semi-Aromatic Polyamide (C)

Novel semi-aromatic polyamides (C) disclosed herein and listed in tables 3A to 3C were prepared by the following process:

The 6T/6I polymer with less than 0.5% moisture was fed through a loss-in-weight main feeder to the first barrel of a 26 mm co-rotating intermeshing twin screw extruder. The extruder consists of 14 barrels, two vent ports and one side feeding port. 6T oligomer with less than 0.5% moisture is fed through the side feeder at barrel 6 or through the main feeder along with semi-aromatic polyamide (A). The first vent port was located downstream of the main feeding port to remove moisture from the polymer at a vacuum of 21 mmHg and the second vent port was located downstream of oligomer side feeding port at a vacuum level of 21 mmHg to remove water generated from the amidation reaction. 6T oligomer feeding rate was adjusted to have the desired weight percent of 6T oligomer relative to semi-aromatic polyamide (A). The average barrel temperatures ranged from about 335 to about 355° C. and screw RPM ranged from 350 to 575 and were adjusted to have a semi-aromatic polyamide (C) melt temperature in the range of 380 to 385° C. at the exit die as measured by a hand held device. Depending on the size and throughput of the extruder, residence time within the extruder ranges from about 30 seconds to less than 1 minute. Semi-aromatic polyamide (C) was collected by extruding into a chilled water bath and pelletized.

TABLE 3A

|  | E1 | E2 | E3 | E4 | E5 | E6 | E7 |
|---|---|---|---|---|---|---|---|
| Polyamide resin (A) | PA-1A | PA-2A | PA-3A | PA-2A | PA-2A | PA-2A | PA-3A |
| 6T/6I (mol %) | 60/40 | 52/48 | 56/44 | 52/48 | 52/48 | 52/48 | 56/44 |
| Wt % A | 87.5 | 73 | 79.5 | 73 | 73 | 73 | 79.5 |
| Oligomer (B) | O-3B | O-3B | O-4B | O-4B | O-2B | O-5B | O-5B |
| Wt % B | 12.5 | 27 | 20.5 | 27 | 27 | 27 | 20.5 |
| Properties |  |  |  |  |  |  |  |
| Polyamide resin (C) (6T/6I) (mol %) | 65/35 | 65/35 | 65/35 | 65/35 | 65/35 | 65/35 | 65/35 |
| IV[1] | 1.08 | 1.12 | 1.08 | 1.08 | 0.98 | 1.04 | 1.01 |
| Amine Ends[2] | 27 | 40 | 31 | 33 | 28 | 30 | 31 |
| Carboxyl Ends | 80 | 63 | 83 | 81 | 104 | 91 | 105 |
| Capped Ends | 57 | 47 | 52 | 47 | 47 | 47 | 52 |
| MP* ($1^{st}$ heating) | 317 | 332 | 329 | 335 | 330 | 336 | 329 |
| MP* ($2^{nd}$ heating) | 311 | 313 | 313 | 317 | 313 | 315 | 313 |
| FP* | 270 | 277 | 271 | 271 | 272 | 278 | 272 |

*MP and FP determined by DSC at 350° C. maximum temperature with 3 min isothermal hold
[1]m-cresol
[2]phenol/methanol The results in Table 3A show the reproducibility of the processes disclosed herein and the use of different semi-aromatic polyamides (A) and polyamide oligomers (B) to arrive at semi-aromatic polyamides (C) having the same 65/35 molar ratio. Examples E1 to E2 use different molar ratios of 6T/6I for semi-aromatic polyamide (A), but different concentrations of polyamide oligomer (B), to prepare semi-aromatic polyamide (C) having a 6T/6I molar ratio of 65/35. Examples E4 to E6 use 52/48 molar ratios of 6T/6I for semi-aromatic polyamide (A) to prepare semi-aromatic polyamide (C) having a 6T/6I molar ratio of 65/35 by using different polyamide oligomers (B). Examples E3 and E7 start with semi-aromatic polyamide (A) having a 6T/6I molar ratio of 56/44 to arrive at semi-aromatic polyamide (C) having a 6T/6I molar ratio of 65/35.

TABLE 3B

|  | E8 | E9 | E10 | E11 | E12 | E13 |
|---|---|---|---|---|---|---|
| Polyamide resin (A) | PA-2A | PA-1A | PA-2A | PA-2A | PA-2A | PA-2A |
| 6T/6I (mol %) | 52/48 | 60/40 | 52/48 | 52/48 | 52/48 | 52/48 |
| Wt % A | 83 | 73 | 67 | 61 | 61 | 73 |
| Oligomer (B) | O-11B | O-3B | O-11B | O-12B | O-9B | O-14B |

TABLE 3B-continued

| | E8 | E9 | E10 | E11 | E12 | E13 |
|---|---|---|---|---|---|---|
| Wt % B | 17 | 27 | 33 | 39 | 39 | 27 |
| Polyamide resin (C) (6T/6I) (mol %) | 60/40 | 71/29 | 68/32 | 71/29 | 71/29 | 65/35 |
| IV | 0.86[1] | 1.16[2] | 1.09[2] | 1.16[2] | 1.12[2] | 1.1[2] |
| Amine Ends | 34[3] | 38[4] | 60[4] | 70[4] | 55[4] | 41[4] |
| Carboxyl Ends | 86 | ND | ND | ND | ND | 74 |
| Capped Ends | 54 | 47 | 43 | 39 | 39 | 47 |
| MP[5] (1st heating) | 321 | 336 | 337 | 343 | 338 | 336 |
| MP[5] (2nd heating) | 301 | 325 | 320 | 327 | 327 | 317 |
| FP[5] | 255 | 287 | 278 | 288 | 285 | 276 |

[1] m-cresol
[2] sulfuric acid
[3] phenol/methanol
[4] hexafluoroisopropanol
[5] MP AND FP determined by DSC at 350° C. maximum temperature with 3 min isothermal hold The results in Table 3B show various semi-aromatic polyamides (C) having different molar ratios of 6T/6I which may be produced by the novel processes disclosed herein. Examples E9, E11, and E12 use different semi-aromatic polyamide (A) and different polyamide oligomers (B) to arrive at semi-aromatic polyamide (C) having the same 6T/6I molar ratio of 71/29 which is a relatively high molar concentration of 6T. Examples E10 and E13 provide semi-aromatic polyamides (C) having molar ratios of 68/32 and 65/35 respectively. Example E8 shows semi-aromatic polyamide (C) comprising 6T/6I (60/40 molar ratio) prepared from a semi-aromatic polyamide (A) having a 52/48 molar ratio of 6T/6I.

Additionally, examples E1 to E13 were tested by DSC at 390° C. and there was only a single melting point observed for the first heating, indicating that reaction between semi-aromatic polyamide (A) and polyamide oligomer (B) had occurred.

TABLE 3C

| | E14a | E14b | C1a | C1b |
|---|---|---|---|---|
| Polyamide resin (A) | PA-2A | PA-2A | PA-2A | PA-2A |
| 6T/6I (mol %) | 52/48 | 52/48 | 52/48 | 52/48 |
| Wt % A | 73 | 73 | 73 | 73 |
| Oligomer (B) | O-14B | O-14B | O-12B | O-12B |
| Wt % B | 27 | 27 | 27 | 27 |
| Properties | | | | |
| Polyamide resin (C) (6T/6I) (mol %) | 65/35 | 65/35 | 65/35 | 65/35 |
| IV[1] | 1.1 | 1.1 | 0.98[1] | 0.98[1] |
| Amine Ends[2] | 41 | 41 | 50 | 50 |
| Carboxyl Ends | 74 | 74 | ND | ND |
| Capped Ends | 47 | 47 | 47 | 47 |
| MP* (1st heating) | 336 | 337 | 295 | 292 368 |
| MP* (2nd heating) | 317 | 301 | 289 | 303 |
| FP* | 276 | 264 | 238 | 264 |
| DSC* max. temp. | 350° C. | 390° C. | 350° C. | 390° C. |

*MP AND FP determined by DSC at maximum temperature indicated with 3 min isothermal hold
[1] sulfuric acid
[2] hexafluoroisopropanol Table 3C provides clear evidence that for polyamide oligomer (B) to react with semi-aromatic polyamide (A) to form semi-aromatic polyamide (C) in the processes disclosed herein, polyamide oligomer (B) must be at, preferably above, its melting point such that both semi-aromatic polyamide (A) and polyamide oligomer (B) are in the melt state. E14a and E14b in Table 3C represent a single polymer test sample which has been tested at two different maximum temperatures by DSC—350° C. and 390° C. C1a and C1b represent a single polymer test sample which has also been tested by DSC at both 350° C. and 390° C.

C1 and E14 in table 3C use the same semi-aromatic polyamide (A) and similar 6T polyamide oligomers (B) to prepare polyamides having the same 65/35 (6T/6I) molar ratios. The same extruder was used to prepare E14 and C1 except the temperatures in the extruder to prepare C1 were different than E14. For C1, polymer exit melt temperature was 355° C. which is above the mp of semi-aromatic polyamide (A) but below the melting point of polyamide oligomer (B) which is about 370° C. Under these extruder conditions, reaction of polyamide oligomer (B) with semi-aromatic polyamide (A) does not readily occur as reflected by the dual melting point (1st heating) of C1 b. The two first melting points of C1 b when tested at 390° C. is due to the presence of semi-aromatic polyamide (A) and unreacted polyamide oligomer (B) which have different melting points.

When tested at 350° C. (C1a) the melting point of polyamide oligomer (B), which is about 370° C., is not reached due to the maximum test temperature of 350 C, resulting in a single melting peak for semi-aromatic polyamide (A).

It should also be noted that when C1 is tested at 390° C., for the second heating, the dual melting points disappear and only a single melting point is present. This is due to the fact that semi-aromatic polyamide (A) and polyamide oligomer (B) reacted during testing resulting in semi-aromatic polyamide (C) having a melting point of 303° C.

E14, when tested by DSC at both 350° C. (E14a) and 390° C. (E14b), exhibits a single melting point at both DSC test temperatures and for both heat cycles indicating that semi-aromatic polyamide (A) and polyamide oligomer (B) have reacted to form semi-aromatic polyamide (C).

TABLE 3D

|  | E15 | E16 | E17 |
|---|---|---|---|
| Polyamide resin (A) | 10T/1010 | 10T/1010 | PA-6A |
| 10T/1010 (mol %) | 80/20 | 80/20 | — |
| Wt % A | 75 | 75 | 59 |
| Oligomer (B) | 10T | 10T | O-15B |
| Wt % B | 25 | 25 | 41 |
| Properties |  |  |  |
| Polyamide resin (C) (mol %) | 85/15 (10T/1010) | 85/15 (10T/1010) | 55/45 (6T/66) |
| IV[1] | 1.0 | 1.04 | 1.08[3] |
| Amine Ends[2] | 47 | 44 | ND[4] |
| Carboxyl Ends | N/A | N/A | ND[4] |
| Capped Ends | 97.5 | 97.5 | 0 |
| MP* (1st heating) | 299 287 | 286 298 | 337 |
| MP* (2nd heating) | 289 | 288 | 322 |
| FP* | 271 | 270 | 280 |

*mp determined by DSC at 350° C. maximum temperature with 3 min isothermal hold
[1]m-cresol
[2]hexafluoroisopropanol
[3]sulfuric acid
[4]Not Dissolved Table 3D shows various semi-aromatic polyamides (C) which are produced by the processes disclosed herein using 10T/1010 semi-aromatic polyamide (A) and 10T polyamide oligomer (B). The terephthalic acid content of semi-aromatic polyamide (A) is increased from 80 mol % to 85 mol % using the novel processes disclosed herein to provide semi-aromatic polyamides (C) as shown by E14 and E15.

Polyamide PA-6A (59 wt %) was fed into an extruder with 6T oligomer O-15B (41 wt %), both fed through main feed port, under the following conditions to make semi-aromatic polyamide (C) E17: melt temperature at the die: 370° C., throughput: 50 pph, screw RPM: 500.

TABLE 3E

|  | C2 | C3 | C4 |
|---|---|---|---|
| PA 6T/6I (mol %) | 65/35 | 68/32 |  |
| PA 6T/66 (mol %) |  |  | 55/45 |
| Properties |  |  |  |
| IV | 0.88[1] | 0.84[1] | 0.99[1] |
| Amine Ends | 23[2] | 25[2] | 65[2] |
| Carboxyl Ends | 97 | 116 | 68 |
| Capped Ends | 40 | 105 | 65 |
| MP* (1st heating) | 315 | 326 | 312 |
| MP* (2nd heating) | 309 | 314 | 267 |
| FP* | 244 | 271 | 304 |

*MP and FP determined by DSC at 350° C. maximum temperature with 1 min isothermal hold
[1]m-cresol
[2]phenol/methanol Table 3E shows the properties of 6T/6I and 6T/66 polyamides produced by an all melt continuous process as disclosed in U.S. Pat. No. 6,759,505. C2 has a 6T/6I molar ratio of 65/35 and a freezing point of 244° C., compared to 6T/6I polyamides having the same molar ratio of repeat units but which have been prepared by the novel processes disclosed herein (E1 to E7). The lowest freezing point of examples E1 to E7 is 270° C., which is 26° C. above the freezing point of C2.

C3 has a 6T/6I molar ratio of 68/32 and a freezing point of 271° C., compared to E10 which has the same molar ratio of repeat units but which has been prepared by the novel processes disclosed herein. E10 has a freezing point of 278° C., which is 7° C. above the freezing point of C3. It should also be noted that as the molar concentration of terephthalic acid increases in the polyamide, the freezing point also increases as shown by C3.

TABLE 3F

|  | C5 |
|---|---|
| Properties | 10T/1010 85/15 (mol %) |
| IV | 0.84[1] |
| Amine Ends | 20[2] |
| Carboxyl Ends |  |
| Capped Ends | 140 |
| MP* (1st heating) | 286 300 |
| MP* (2nd heating) | 289 |
| FP* | 262 |

*MP and FP determined by DSC at 350° C. maximum temperature with 1 min isothermal hold
[1]98% sulfuric acid
[2]hexafluoroisopropanol C5 in table 3F is produced in an autoclave by an all melt batch process and has a freezing point of 262° C. compared to examples E15 and E16 which have the same 10T/1010 molar ratio as C6 (85/15) but which have been prepared by the processes disclosed herein. The freezing points of E15 and E16 are 271° C. and 270° C., respectively, which are at least 8° C. above the freezing point of C5.

|  | E1 | C2 | E10 | C3 | E15 | C5 | E17 | C4 |
|---|---|---|---|---|---|---|---|---|
| Polymer | 6T/6I | 6T/6I | 6T/6I | 6T/6I | 10T/1010 | 10T/1010 | 6T/66 | 6T/66 |
| mol % | 65/35 | 65/35 | 68/32 | 68/32 | 85/15 | 85/15 | 55/45 | 55/45 |
| MP[1] (1st heating) | 317 | 315 | 337 | 326 | 299/287 | 299/286 | 335 | 312 |
| MP[1] (2nd heating) | 305 | 309 | 320 | 314 | 289 | 289 | 322 | 304 |
| FP[1] | 262 | 244 | 278 | 271 | 271 | 264 | 279 | 267 |
| FP Δ* | 18 | | 7 | | 7 | | 12 | |

*Difference between FP of example and comparative example
[1]All MP and FP at 350° C. with 1 min isothermal hold Table 3G summaries the differences in freezing points between semi-aromatic polyamides prepared by the processes disclosed herein and all-melt continuous or batch processes. The semi-aromatic polyamides in comparative examples C2, C3, and C4 are prepared by all-melt continuous processes as disclosed in U.S. Pat. No. 6,759,505, example 3. C5 is produced by a batch process.

As shown by table 3G, E1 and C2 have identical molar ratios of 6T/6I. E1 has the lowest FP of all the 65/35 examples at 269° C. and C2 has a FP of 244° C., a difference of 25° C. E10 and C3 have identical molar ratios of 6T/6I and prepared by different processes. E10 has a FP of 278° C. and C3 has a FP of 271° C., a difference of 7° C. A difference in FP's of 7° C. and 12° C. is shown between E15 and C5, and E17 and C4 respectively.

These differences in freezing points is a clear indication of differences in chemical structure between semi-aromatic polyamides prepared by the processed disclosed herein and by existing all-melt continuous or batch processes.

The invention claimed is:

1. A process comprising the step of melt-mixing a semi-aromatic polyamide (A) having a melting point on second heating of 295° C. or less comprising terephthalamide repeat units and a polyamide oligomer (B) having a melting point on second heating at least 10° C. greater than the melting point on second heating of semi-aromatic polyamide (A), said polyamide oligomer (B) comprising terephthalamide repeat units and having an amine end group concentration of less than 2000 me q/Kg and an inherent viscosity of at least 0.10 measured according to ISO 307:2007, at a temperature which is greater than the melting point on first heating of both semi-aromatic polyamide (A) and polyamide oligomer (B) for a time period sufficient to produce semi-aromatic polyamide (C) having a melting point on second heating which is greater than or equal to 300° C., wherein said melting points on first and second heating are determined according to ASTM D3418:2015.

2. The process of claim 1 wherein semi-aromatic polyamide (A) comprises repeat units derived from:
   (a) at least one dicarboxylic acid comprising:
      (i) greater than 20 to about 100 mole percent terephthalic acid;
      (ii) from 0 to about 80 mole percent dicarboxylic acid selected from isophthalic acid and aliphatic diacids comprising 4 to 20 carbon atoms; and
   (b) at least one aliphatic diamine having 4 to 20 carbon atoms; and optionally
   (c) an aliphatic lactam or an aliphatic amino carboxylic acid with 6 to 20 carbon atoms.

3. The process of claim 1 wherein polyamide oligomer (B) comprises the same terephthalamide repeat units of semi-aromatic polyamide (A).

4. The process of claim 1 wherein the semi-aromatic polyamide (A) is selected from the group consisting of: PA6T/6I, PA6T/610, PA6T/66, PA 6T/612, PA10T/1010, PA10T/101, PA 10T/11, PAST/510, PA6T/DT, PA4T/410, PA6T/9T, PA9T/10T, PAST/5I, PA6T/6I/6, and PA6T/6I/66.

5. The process of claim 1 in which the melt-mixing takes place in an extruder.

6. The process of claim 5 wherein the extruder is a twin-screw extruder.

7. The process of claim 1 wherein polyamide oligomer (B) has an amine end group concentration of less than or equal to 1000 meq/Kg and an IV of at least 0.15.

8. The process of claim 1 wherein the time period is less than 3 minutes.

9. The process of claim 1 wherein the time period is less than 1 minute.

10. The process of claim 1 wherein the weight percent of semi-aromatic polyamide (A) ranges from 60 to 90 and polyamide oligomer (B) ranges from 10 to 40 weight percent based on the weight percent of A and B.

11. The process of claim 1 wherein semi-aromatic polyamide (C) comprises at least 5 mole percent higher terephthalamide content than semi-aromatic polyamide (A).

12. The process of claim 1 wherein semi-aromatic polyamide (C) has an excess of amine end groups.

13. The process of claim 1 wherein semi-aromatic polyamide (C) has an excess of acid end groups.

14. The process of claim 1 wherein the melt-mixing temperature is between 425° C. and 250° C.

15. The process of claim 1 wherein the time period sufficient to produce semi-aromatic polyamide (C) ranges from about 15 seconds to 4 minutes.

16. The process of claim 1 wherein the melt-mixing temperature ranges from about 305° C. to 400° C.

17. The process of claim 1 wherein polyamide oligomer (B) comprises at least 10 mole percent higher content of terephthalamide repeat units than semi-aromatic polyamide (A), based on the total molar content of dicarboxylic acid repeat units in semi-aromatic polyamide (A).

18. The process of claim 17 wherein the terephthalamide repeat units are hexamethylene terephthalamide repeat units.

* * * * *